United States Patent
Du et al.

(10) Patent No.: US 7,895,123 B1
(45) Date of Patent: Feb. 22, 2011

(54) DIGITAL CONTENT PUBLICATION

(75) Inventors: L. Garren Du, Brooklyn, NY (US); Bryant Chih-Ming Lee, New York, NY (US); Gabriel Martin Flores, Boston, MA (US); William Henry Miceli, Chicago, IL (US)

(73) Assignee: Accenture Global Services Limited (IE)

( * ) Notice: Subject to any disclaimer, the term of this patent is extended or adjusted under 35 U.S.C. 154(b) by 734 days.

(21) Appl. No.: 09/879,267

(22) Filed: Jun. 12, 2001

(51) Int. Cl.
*G06Q 99/00* (2006.01)

(52) U.S. Cl. ............................. 705/57; 705/51; 705/52; 705/59; 713/150

(58) Field of Classification Search ................ 705/1, 705/50–59, 26; 713/200, 150, 182; 380/200–202; 726/2, 4, 26–33
See application file for complete search history.

(56) References Cited

U.S. PATENT DOCUMENTS

| | | | |
|---|---|---|---|
| 5,508,731 A | 4/1996 | Kohorn | |
| 5,794,221 A | 8/1998 | Egendorf | |
| 5,802,296 A | 9/1998 | Morse et al. | |
| 5,848,415 A | 12/1998 | Guck | |
| 5,940,504 A | 8/1999 | Griswold | |
| 6,026,388 A | 2/2000 | Liddy et al. | |
| 6,029,145 A | 2/2000 | Barritz et al. | |
| 6,041,316 A | 3/2000 | Allen | |
| 6,084,865 A | 7/2000 | Dent | |
| 6,112,181 A | 8/2000 | Shear et al. | |
| 6,119,229 A | 9/2000 | Martinez et al. | |
| 6,135,646 A | 10/2000 | Kahn et al. | |
| 6,161,107 A | 12/2000 | Stern | |
| 6,189,008 B1 | 2/2001 | Easty et al. | |
| 6,202,056 B1 | 3/2001 | Nuttall | |

(Continued)

FOREIGN PATENT DOCUMENTS

EP 1041823 A2 * 10/2000

(Continued)

OTHER PUBLICATIONS

Foster, C., "Content Management: Defining Requirements for Competitive Advantage," Mar. 1999, Jupiter Strategic Planning Services/SOS99-21, pp. 1-22.

(Continued)

*Primary Examiner*—Jalatee Worjloh
(74) *Attorney, Agent, or Firm*—Fish & Richardson P.C.

(57) ABSTRACT

A method and system for receiving digital content and metadata associated with the digital content. In an embodiment, the method and system inputs publication information associated with the digital content, produces protected digital content, stores the protected digital content, and sends a message including the metadata and the publication information.

27 Claims, 5 Drawing Sheets

U.S. PATENT DOCUMENTS

| | | | |
|---|---|---|---|
| 6,219,788 | B1 | 4/2001 | Flavin et al. |
| 6,226,618 | B1 * | 5/2001 | Downs et al. ................. 705/1.1 |
| 6,229,533 | B1 | 5/2001 | Farmer et al. |
| 6,236,994 | B1 | 5/2001 | Swartz et al. |
| 6,263,313 | B1 | 7/2001 | Milsted et al. |
| 6,345,256 | B1 | 2/2002 | Milsted et al. |
| 6,356,903 | B1 | 3/2002 | Baxter et al. |
| 6,418,467 | B1 | 7/2002 | Schweitzer et al. |
| 6,502,131 | B1 | 12/2002 | Vaid et al. |
| 6,839,680 | B1 | 1/2005 | Liu et al. |
| 6,842,782 | B1 | 1/2005 | Malik et al. |
| 6,854,009 | B1 | 2/2005 | Hughes |
| 6,857,020 | B1 | 2/2005 | Chaar et al. |
| 6,898,618 | B1 | 5/2005 | Slaughter et al. |
| 6,904,449 | B1 | 6/2005 | Quinones |
| 6,917,979 | B1 | 7/2005 | Dutra et al. |
| 7,092,914 | B1 | 8/2006 | Shear et al. |
| 2001/0011303 | A1 | 8/2001 | Chang et al. |
| 2001/0037316 | A1 | 11/2001 | Shiloh |
| 2001/0049632 | A1 | 12/2001 | Rigole |
| 2002/0055912 | A1 | 5/2002 | Buck |
| 2002/0077988 | A1 * | 6/2002 | Sasaki et al. ................. 705/59 |
| 2002/0087674 | A1 | 7/2002 | Guilford et al. |
| 2002/0107809 | A1 * | 8/2002 | Biddle et al. ................. 705/59 |
| 2002/0116293 | A1 * | 8/2002 | Lao et al. ..................... 705/27 |
| 2002/0143819 | A1 | 10/2002 | Han et al. |
| 2002/0143920 | A1 | 10/2002 | Dev et al. |
| 2002/0152297 | A1 | 10/2002 | Lebourg et al. |
| 2003/0004844 | A1 | 1/2003 | Hueler |
| 2003/0023564 | A1 * | 1/2003 | Padhye et al. ................. 705/54 |
| 2003/0046395 | A1 | 3/2003 | Fleming et al. |
| 2003/0053448 | A1 | 3/2003 | Craig et al. |
| 2003/0093798 | A1 | 5/2003 | Rogerson |
| 2003/0225696 | A1 * | 12/2003 | Niwa .......................... 705/50 |
| 2004/0039704 | A1 * | 2/2004 | Gilliam et al. ................. 705/50 |
| 2004/0064471 | A1 * | 4/2004 | Brown et al. ................. 707/100 |
| 2005/0171958 | A9 | 8/2005 | Cheng et al. |
| 2009/0265278 | A1 * | 10/2009 | Wang et al. ................... 705/54 |

FOREIGN PATENT DOCUMENTS

| | | |
|---|---|---|
| GB | 2 260 007 | 3/1993 |
| WO | WO 96/27155 | 9/1996 |
| WO | WO99/31610 | 6/1999 |
| WO | WO 00/42555 | 7/2000 |
| WO | WO01/11511 | 2/2001 |
| WO | WO01/28141 | 4/2001 |
| WO | WO 01/44907 A1 | 6/2001 |
| WO | WO01/69903 | 9/2001 |

OTHER PUBLICATIONS

Kirzner, R., "Managing Content: The Key to Success in Web Business," Jun. 1999, *International Data Corporation*, pp. 1-12.
Sanborn, S., "Content management expands its role," Feb. 19, 2001, *Infoworld*, p. 38.
"Content management made strategic," Feb. 19, 2001, *Infoworld*, p. 48.
White, A. S., "Managing the Development and Delivery of Content." May 1999, *International Data Corporation*, pp. 1-15.
Knox, R., "Multichannel Output: Process Changes on Horizon," Apr. 20, 1999, Gartner Group, Inc., 4 pp.
Ingalls, J., Lundy, J., "Where Is Output Headed? Ten Key Trends," Jan. 12, 1999, Gartner Group, Inc., 5 pp.
Seeley, C., Dietrick, B., "Crafting a Knowledge Management Strategy, Part two. Marrying content with IT applications," *Knowledge Management Review*, Issue 12 Jan./Feb. 2000, pp. 20-23.
Berg, T., Drakos, N., Valdes, R., "Web-Site Deployment and Operations," Jan. 8, 1999, Gartner Group, Inc., 76 pp.
Robins, S., Mahony, C., "Web Content Management for Pervasive Content," The Yankee Group, Oct. 13, 2000 pp. 1-26.
"Open Market e-Business Suite," Oct. 13, 2000, http://www.openmarket.com/egi-.../Render&c=Collection&cid=0M176UJ9KYB&live=tru, 2 pp.
"Knowledge Organizer: Organize your intranet content the way you organize your business," http://www.verity.com/products/ko/, Verity® Knowledge Organizer®, Product Overview, Oct. 13, 2000, Verity, Inc., 2 pp.
"ThomasTech Content Management Solutions," http://www.thomastechsolutions.com.content.htm, Oct. 13, 2000, Thomas Technology Solutions, Inc., 3 pp.
"U.K.'s second largest retailer, Great Universal Stores, purchases VALEX software to increase relevance and impact of marketing campaigns," Jun. 21, 2000, http://www.xchange.com/news/press_releases/1999/1999-07-19-02.asp, Exchange Applications, pp.
"What is eCRM?," http://www.xchange.com/resource/default.asp, Jun. 21, 2000, Exchange Applications, 1 p.
"Step 1: Identify your most profitable customers," http://www.xchange.com/resource/step1.asp, Jun. 21, 2000, Exchange Applications, 1 p.
"Step 2: Personalize your marketing efforts through technology," http://www.xchange.com/resource/step.asp, Jun. 21, 2000, Exchange Applications, 1 p.
"Step 3: Evaluate the results of your strategies," http://www.xchange.com/resource/step3.asp, Jun. 21, 2000, Exchange Applications, 1 p.
"Glossary," http://www.xchange.com/resource/gloassary.asp, Jun. 21, 2000, Exchange Applications, 5 pp.
Whitepaper Request, "Evolving to eCRM: How to optimize interactive relationships between you and your customers," http://www.xchange.com/resource/whitepaper.asp, Jun. 21, 2000, Exchange Applications. 1 p.
"V/5 E business Platform Architecture," http://www.vignette.com/CDA/Site/0,2097,1-1-731-1191-733-1196,FF.html, Jun. 21, 2000, Vignette Corporation, 4 pp.
Vignette Application Power Pack™, Jun. 21, 2000, Vignette, 2 pp.
"IMRglobal," http://www.ca.imrglobal.com/contact.htm, Jun. 21, 2000, 2 pp.
"4i Content Management," http://www.documentum.com/products/content/index.html, Jun. 21, 2000, Documentum, Inc., 2 pp.
"Documentum 4i eBusiness Edition starts with:," http//www.documentum.com/products/content/internet-4i/doc4i.html, Jun. 21, 2000, Documentum, Inc., 2 pp.
"Documentum eDeploy™," http://www.documentum.com/produts/content/internet-4i/edeploy.html, Jun. 21, 2000, Documentum, Inc., 1 p.
"Documentum eConnectors™," http://www.documentum.com/products/content/internet-4i/econnectors.html, Jun. 21, 2000 Documentum, Inc., 2 pp.
"Documentum 4i Integrators," http://www.documentum.com/products/content/internet-4i/integrators.html, Jun. 21, 2000 Documentum, Inc., 1 p.
"Documentum FrameLink Product Suite," http://www.documentum.com/products/content/internet-4i/framelink.html, Jun. 21, 2000, Documentum, Inc., 1 p.
Documentum e-Business Development Tools,: http://www.documentum.com/products/content/internet-4i/devstudio.html, Jun. 21, 2000, Documentum, Inc., 2 pp.
Black Pearl—Main Body, http://blackpearl.com/solutions/solutions_body.html, Jun. 21, 2000, Black Pearl, Inc. 3 pp.
Black Pearl—Main Body, http://www.blackpearl.com/company/company_body.html, Jun. 21, 2000, Black Pearl, Inc., 2 pp.
"Making Clicks and Mortor Click™: Extending relationship business' expertise into e-markets.," 2000, Black Pearl, Inc., 2 pp.
"About Documentum," http://www.documentum.com/company/about/index.html, Jun. 21, 2000. Documentum, Inc.,.
Web Content Management Strategies, Technologies and Markets, 2000, Ovum Ltd., pp. 1-230.
Jee et al., "A DAVIC Video-on-Demand System Based on the RTSP", *IEEE Comput. Soc*, pp. 231-238, (2001).
Chabot, P., "Communication pursuant to Article 96(2) EPC", *European Patent Office*, Oct. 13, 2005.
Chabot, P., "Communication pursuant to Article 96(2) EPC", *European Patent Office*, Mar. 3, 2005.

\* cited by examiner

Rights Management
Click "Publish" once you have entered all applicable product information.

Background

Title: * | Kenyon Martin

Description: | Kenyon Martin tomahawk dunks over Jermaine O'Neal.

Author(s): * | 
NOTE: Use commas to separate multiple authors.

Length: | 12.3

Publisher: | demoprod

Publisher email: | demoprod@digitalcreations.com

Distribution

Distributor:
* All Distributors *
DCS Sports
Live 24-7 Sports
Sports World

Catalog: < Select Catalog >

Category: < Select Category >

Keywords:
Boston Bulldozers
Los Angeles Miners
New Jersey Torpedoes
New York Skyscrapers
Philadelphia Bombers

Pricing

Price Structure: Retail

Currency: United States Dollars

Type: ⊙ Online Play  ○ Offline Play

Play Price:*

[Publish] ← 78   [Clear] ← 80

FIG. 4B

DIGITAL CONTENT PUBLICATION

BACKGROUND

This invention relates to digital content publication. In particular, the invention is directed to a method and system for receiving digital content and metadata associated with the digital content, inputting publication information associated with the digital content, protecting the digital content, and sending a message including the metadata and publication information.

Content publishers are frequently responsible for managing digital content, such as audio, music, video, or text that may have been transformed into a digital format (digital asset). Many content publishers have expended much effort to incorporate new technologies within their core infrastructures. Bridging the gap between old and new technologies may be a complex task.

Many content publishers have adopted manual and time-consuming processes to create a seamless transition between the creation and the distribution of digital content. Some have incorporated a digital content management (DCM) system into their organizations to address the need for streamlining digital content storage and for repurposing digital content, while others have continued to store the content in warehouses. Many content publishers have focused on preventing unauthorized distribution of digital contents by using a digital rights management (DRM) system solution. A DRM system solution may include technologies to enforce digital rights such as, for example, watermarking, container-based encryption, and sniffer technologies.

However, current solutions may lack the ability to integrate DCM and DRM systems. The lack of integration often requires the content publisher to extract the digital content and metadata associated with the digital content from the DCM system and manually transfer it to the DRM system. In addition, there may be no integration between the process of entering price and rights information about the content and the process of extracting the digital content from the DCM system.

Moreover, many content publishers involve third parties in the protection and distribution of digital content. Content publishers often have to transfer the digital content to the third parties resulting in a loss of control over the digital content.

SUMMARY

In one aspect, the present invention provides a method that includes receiving digital content and metadata associated with the digital content, receiving publication information associated with the digital content, producing protected digital content, and sending a message including the metadata and publication information.

The aforesaid method may include receiving digital content from a digital content management (DCM) system and receiving publication information using a graphical user interface (GUI). Digital content can include at least one of streaming video content, music content, graphic content, print content, or audio content. Metadata may include at least one of a name, length, publisher, location, or description associated with the digital content. Publication information may include at least one of pricing, rights, or catalog information associated with the digital content.

The method also may include encrypting the digital content and storing the encrypted digital content into a file transfer protocol (FTP) directory such that the digital content is accessible over a network, and encrypting the digital content and storing the encrypted digital content into a real server transfer protocol (RSTP) directory such that the digital content is capable of being streamed over a network. The method also can produce thumbnail information associated with the digital content and storing the thumbnail information into a hypertext transfer protocol (HTTP) directory such that the thumbnail information is accessible over a network. The method also can control access to the digital content over a network using an XrML license.

The method also may include sending a rights-label to a DRM system, wherein the rights-label includes metadata and publication information associated with the digital content. The method may comprise alerting a digital content distributor of the availability of the metadata and publication information associated with the digital content.

In a second aspect, the invention provides a digital content publication apparatus configured to perform the methods disclosed above.

In a third aspect, the invention provides an article comprising a computer-readable medium that stores computer executable instructions for causing a computer system to perform the methods disclosed above.

In a fourth aspect, the invention provides a digital content management (DCM) computer configured send digital content and metadata associated with the digital content to a digital content publication (DCP) computer, in response to a request by the DCP computer. In an embodiment, the metadata may include at least one of a name, length, publisher, location, or description associated with the digital content.

In a fifth aspect, the invention provides a digital rights management (DRM) system configured to retrieve metadata and publication information, in response to a message that the metadata and the publication information are available, and store the metadata and the publication information. In an embodiment, the metadata may include at least one of a name, length, publisher, location, or description associated with the digital content. The publication information may include at least one of pricing, rights, or catalog information associated with the digital content.

In a sixth aspect, the invention provides a content distributor system configured to retrieve metadata and publication information associated with digital content, in response to an alert that the metadata and the publication information is available, store the metadata and the publication information, and make available the metadata and the publication information. In an embodiment, the metadata may include at least one of a name, length, publisher, location, or description associated with the digital content. The publication information may include at least one of pricing, rights, or catalog information associated with the digital content.

In a seventh aspect, the invention provides a content consumer computer configured to request a license to purchase digital content, and retrieve protected digital content based on whether the license grants access to the digital content. In an embodiment, the computer may be configured to retrieve thumbnail information associated with the digital content.

The foregoing techniques can enable the interaction between the DCM system and the DRM system to be automated. It can simplify the transfer of digital content and metadata associated with the digital content from the DCM system to the content distributor. In addition, the content distributor can connect directly to the DRM system and extract metadata and publication information associated with the digital content and store it in a local database. The content distributor can then use the information to list the digital content in the Web-catalog it maintains.

The foregoing techniques also can decrease the manual process required to move the digital content to the content distributor. For example, the transfer of the digital content and the metadata to the DRM system is automated. Encryption of the digital content also is automated. Moreover, the content publisher has more control over the digital content. For example, the digital content can be encrypted and packaged and then hosted on content publisher's own server or Website. This may result in decreased dependence on third party application service providers (ASP) such as, for example, the DRM system or the DCM system.

In addition, the foregoing techniques can provide a flexible solution which can be adapted to numerous situations depending on the needs and capabilities of the entities involved. For example, the size of the organization interested in creating and distributing digital content may be considered. For instance, a large organization may have the resources to host their own digital content rather then make use of third party resources such as a DCM system, a DRM system, or a content distributor. Each industry may have unique business models having an effect on how the particular solution is implemented. In addition, a process for incorporating content into the Web-catalog of the distributor must be coordinated. For example, the content distributor must have the willingness and capabilities to pull content information from the DRM system.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 4A-4B are simplified screen shots of a user interface according to an implementation of the invention.

Like reference symbols in the various drawings indicate like elements.

DETAILED DESCRIPTION

Figure 1:
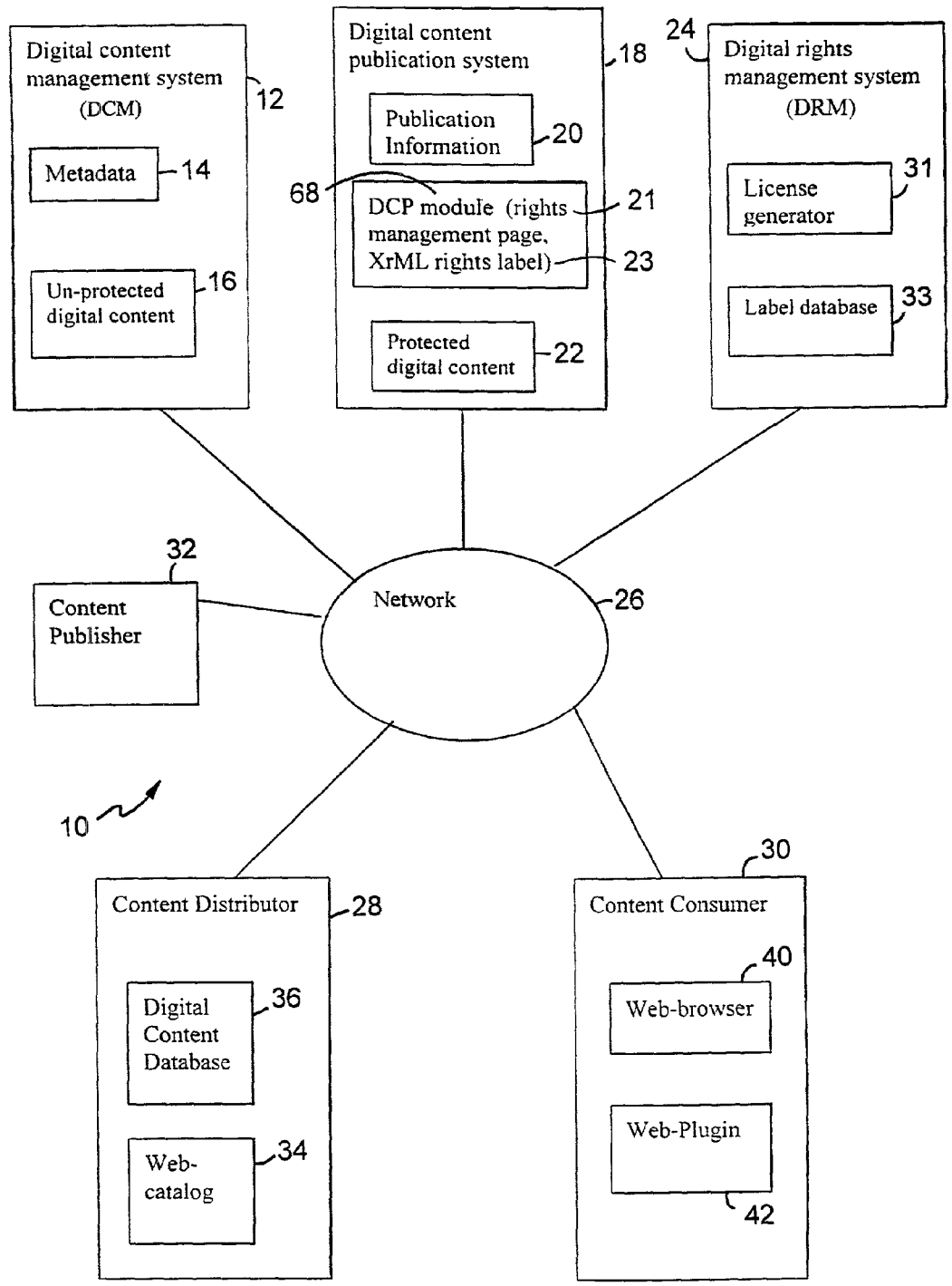
FIG. 1 is computer network system according to an implementation of the invention.

FIG. 1 shows a system 10 that can include a digital content publication (DCP) system 18 which can be used by a content publisher 32 to facilitate the publication of protected digital content 22. The DCP system 18 communicates with a digital content management (DCM) system 12 to retrieve unprotected digital content 16 and metadata 14 associated with the unprotected digital content. A digital rights management (DRM) system 24 receives and stores publication information 20 and metadata associated with the protected digital content 22 from the DCP system 18. A content distributor 28 is alerted by the DCP system 18 that information associated with the protected digital content 22 is available from the DRM system 24. As a result, a content consumer 30 can search for digital content from the content distributor 28 and retrieve the digital content from the DCP system 18 once the consumer has been authorized.

The content publisher 32 can be embodied as a client computer communicating over a network 26 with the DCP system 18. Such a network 26 can include, for example, the Internet, the World Wide Web (Web), a local area network (LAN), or other network. The protected digital content 22 can include, for example, Web-based content such as music, audio, video, sound, or print that may have been transformed into a digital format.

The DCM system 12 can include, for example, a server computer connected to the network 26 capable of providing functions such as centralized digitizing, cataloguing, and tracking of unprotected digital content 16 and metadata 14 associated with the unprotected digital content 16.

The DCP system 18 can communicate with the DCM system 12 over the network 26. The DCP system 18 can produce protected digital content 22 by extracting the unprotected digital content 16 from the DCM system 12 and encrypting and storing the protected content into the DCP system 18. The DCP system 18 can provide the content publisher 32 with a program module 68 to allow publication information 20 related to the protected digital content 22 to be entered. Such a module 68 can include, for example, an active server page (ASP) capable of being executed from the DCP system 18 and having a graphical user interface (GUI). In addition, the module 68 can provide a rights management screen 21 that can enable publication information 20 to be entered and the metadata to be modified.

The DRM system 24 is capable of processing extensible rights markup language (XrML) labels 23 generated by the DCP system 18. The XrML labels 23 can include the publication information and metadata data information associated with the digital content 22. XrML is an open specification for describing rights, fees, and conditions for using digital content over a network. The DRM system 24 can be a server computer connected to the network 26 and can include a label database 38 that can be used to store the XrML labels 23. However, the protected digital content 22 is not stored in the DCM system 24. Instead, it is stored at the DCP system 18 and access can be controlled by the DCP system. The DRM system 24 can act like a "rights clearing house" by providing a security check between the protected digital contents 22 stored at the DCP system 18 and a content consumer 30 by assuring that the consumer interested in purchasing the protected digital content 22 has sufficient access.

The DRM system 24 also can include a license generator 32 which can be used to generate an encryption license permitting the protected digital contents 22 to be accessed by a content consumer 30. A license can be requested by the content consumer 30 through the content distributor 28. The license can be transferred to a content consumer 30 after the consumer has been validated or authorized to access the protected digital content 22. The DRM system 24 can distribute the publication information and metadata information associated with the protected content from the label database 38 to a content distributor 28.

The content distributor 28 can be a server computer configured as an online e-commerce Web-site connected to the network 26. It can include a content database 36 providing the content consumer 30 information related to the digital contents that may be available for purchase. Such a database can include, for example, Microsoft SQL 2000, Oracle, Sybase, or other database. The information in the database 36 can be used to populate the Web-catalog 34 which can be a part of the content distributor's 28 storefront Web-site. The content distributor 28 can be running a server based operating system (OS) providing a turnkey approach to the implementation of an e-commerce Web-site. Such an OS can include, for example, Microsoft commerce server 2000 OS.

The content consumer 30 can be a client computer connected to the network 26. For example, in an Internet computer network embodiment, the content consumer computer 30 can be running a Web-browser 40 enabling the consumer to browse the Web including the content distributors 28 Website. The content consumer 30 also can be running a "plugin" 42 which may allow digital content in different formats to be download and viewed, such as, for example, streaming video.

Figure 2:
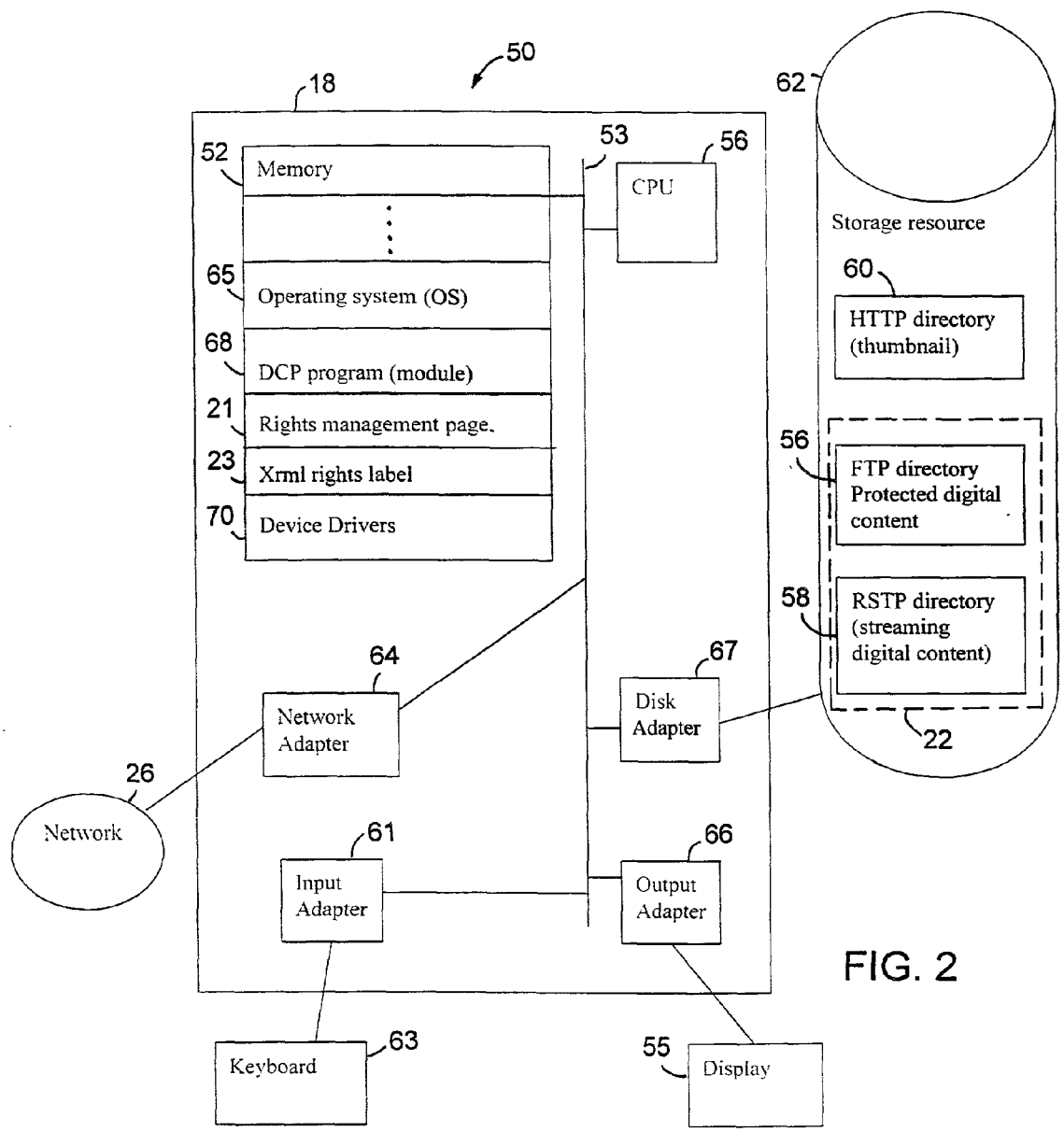
FIG. 2 is computer system according to an implementation of the invention.

FIG. 2 is a computer system 50 showing an embodiment of a DCP system 18 according to the invention. The DCP system 18 can be a server computer such as, for example, an Internet information server (IIS) or other server computer. The DCP system 18 can include a central processing unit (CPU) 56 such as an Intel Pentium Processor. The DCP system 18 also can include a system bus 53 that can provide a connection to various computer components by using adapters such as, for example, a output device adapter 66, an input device adapter 61, a disk adapter 67, a network adapter 64, or other adapters. The disk adapter 67 can be used to couple a storage device 62 to the system bus 53. The storage device 62 can include any device capable of holding large amounts of data, such as a hard drive, compact disk read-only memory (CD-ROM), digital versatile disk (DVD), redundant array of inexpensive drives (RAID), or other storage device.

The input device adapter 61 can connect an input device 63 such as a pointing device, a mouse, track ball, light pen, touch-sensitive display, or other type of pointing device and may be used in combination with a keyboard 63 to input data into the DCP system 18. The output device adapter 66 can be used to connect a display device 55 capable of displaying images and other information. The network adapter 64 can couple the DCP system 18 to a network 26. Such a network can be wired or wireless and an can include, for example, a LAN, a WAN, a token-ring, Ethernet, the Internet, the Web, or digital subscriber line (DSL) adapter or a cable or high-speed analog modem, or other network.

The DCP system 18 can include memory 52, such as, for example, read only memory (ROM), random access memory (RAM), static random access memory (SRAM), dynamic random access memory (DRAM), or other memory which can be connected to the CPU 56 through system bus 53. The CPU 56 can execute programs running in memory 53 and process data residing in memory 53. For example, an OS 66 can be a program responsible for running other programs and for managing the resources of the DCP system 18. Such an OS may include, for example, SUN Apache, Windows 2000, Linux, Unix, or other server based OS. A device driver 70 can be a set of programs that can handle the low-level aspects of computer devices and interfaces such as the storage device 62 or the network adapter 64.

A DCP module 68 can be a program in memory 52 that can provide the functionality of digital content publication system according to the invention. The operation of the DCP module 68 will be discussed in detail later. The DCP module 68 can be accessible by other computers over the network 26. For example, the DCP module 68 can be launched or executed by a program running on the DCM system 12. The DCP module 68 is capable of generating display screens such as a rights management page 21 which will be discussed later (FIGS. 4A-4B). The DCP module 68 also can generate XrML rights labels 23 which can include information associated with the protected digital content. A program running on the DCM system 12 could use a uniform resource link (URL) embedded in the program that can reference the location of the DCP module 68. The URL represents the address of a file (resource) accessible on the Internet.

As discussed above, the DCP module 68 can be implemented using, for example, ASP technology which can include a hypertext markup language (HTML) page having one or more scripts (small embedded programs) that can be processed on a server computer before the HTML page is executed by the DCM system 12. HTML is a set of markup symbols or codes inserted in a file intended for display on a Web-browser.

ASP technology is similar to a server side program or a common gateway interface (CGI) application since they involve programs that can run on a server computer. In general, a server is a computer program that can provide services to other computer programs in the same or other computers. In a client/server programming model, a server is a program that awaits and fulfills requests from client programs in the same or other computers. A given application in a computer may function as a client with requests for services from other programs and also as a server of requests from other programs.

The storage resource 62 can be configured to include a HTTP directory 60 providing space for storage and retrieval of thumbnails associated with the protected digital content 22. A thumbnail represents a preview image of the digital content 22 such as, for example, a small picture of a book or a clip of music. HTTP is an application level protocol for exchanging files over a network such as the Web. The files can include, for example, text, graphics, sound, video, or other file types. HTTP allows files to contain a reference or a hyperlink to other files whose selection may elicit additional file requests.

As part of HTTP, a server computer may include programs that can wait for HTTP requests and handle them as they arrive. Similarly, a client computer running a Web-browser using HTTP can issue HTTP requests. For example, the content consumer 30 can be a client computer running a Web-browser 40 that can access the thumbnails in the HTTP directory by issuing HTTP requests over the network 26. In response, the DCP system 18 can be adapted to run HTTP and to respond to HTTP requests by retrieving the requested thumbnail and returning the thumbnail file to the client.

Similarly, the storage resource 62 can be configured to include a file transport protocol (FTP) directory 56 which can provide space for storage and retrieval for protected digital content 22. FTP is a standard Internet protocol providing for the exchange of files between computers over a network such as the Internet. A client computer connected to the Internet and running a Web-browser can issue FTP requests directed to a server to download a program or file from the server. For example, once the content consumer 30 has been authorized to access the digital content 22, the content consumer can issue FTP requests directed to the DCP system 18 to access or view the digital content 22.

Likewise, a real server transport protocol (RSTP) directory 58 can provide storage and retrieval for digital content 22 that is capable of being formatted into streaming media such as streaming video and audio. For example, the digital content 22 can be in a streaming video format represented by a sequence of "moving images" that can be compressed and transmitted over the network 26. In streaming video, the video images are sent in a continuous stream and played as they arrive.

To play the streaming video, a player, usually in the form of a "plugin", is necessary to uncompress the video and send the audio portion to a speaker and the video portion to the display on the content consumer 30. For example, once the content consumer 30 has been authorized to access the protected digital content 22, the content consumer has the option of accessing the a digital content in a streaming format from the RSTP directory using various streaming technologies. Such technologies may include, for example, real network realsystem G2, Microsoft windows media video, or other streaming technologies.

Figure 3:
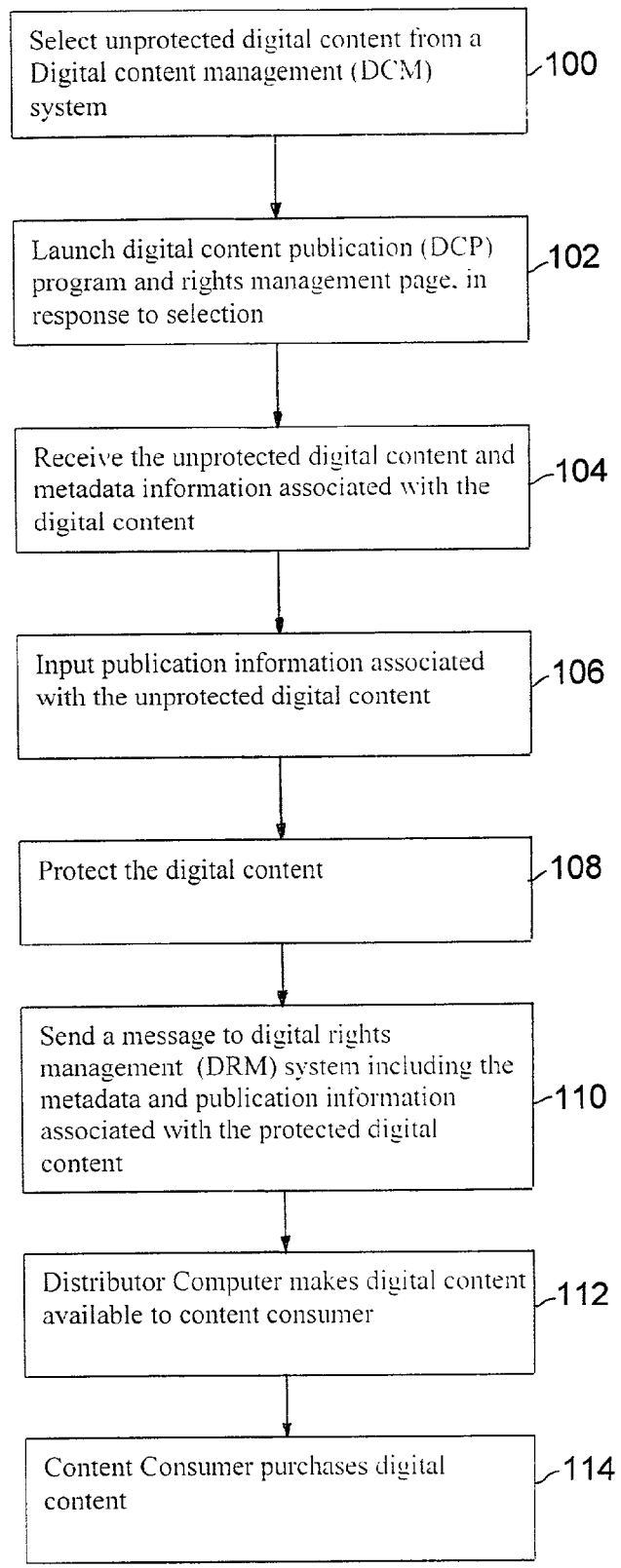
FIG. 3 is a flow chart according to an implementation of the invention.

FIG. 3 is a flow chart of an embodiment of techniques according to the invention. The content publisher 32 can search 100 for a particular unprotected digital content 16 stored on the DCM system 12 using a DCM program having a GUI provided by the DCM system. The content publisher 32 can then select unprotected digital content 16 for distribution or publication from the DCM system 12.

Once a selection has been made, the DCM program can cause the DCP module 68 residing in the DCP system 18 to be executed (launched) 102 through the use of the URL linking mechanism discussed above. Once the DCP module 68 begins executing in the DCP system 18, the module can receive 104 the metadata associated with the unprotected digital content 16 that had been previously selected by the content publisher. In addition, the DCP module 68 can generate a rights management screen 21 as shown in FIGS. 4A-4B which will be discussed below.

The rights management screen 21 can provide the content publisher with a GUI interface to input 106 publication information associated with the digital content. The DCP module 68 populates the rights management screen 21 with the metadata information it had received from the DCM system 12. The rights management screen 21 allows the content publisher 32 to modify the metadata information. Once the content publisher 32 completes inputting publication information onto the rights management screen 21 provided by the DCP system 18, the content publisher can "click" the publish button causing the screen to terminate. However, the DCP module 68 continues to perform various functions as discussed below.

Once the publish button has been clicked, several events occur which may not be visible to the content publisher. For example, the DCP module 68 can protect 108 the digital content by encrypting the digital content resulting in content that is protected from unauthorized access and distribution. The DCP module 68 also can control accesses to the protected digital content 22. Protecting can include storing the digital content 22 in the DCP system 18 instead of sending the content to another system such as the DRM system or the content distributor 28. As a result, the DCP system 18 maintains control over the digital content.

The digital content also can be stored in the FTP directory 56 for access over the network 26 by the content consumer 30. The digital content 22 that is capable of being streamed over the network 26 can be stored in the RSTP directory 58. In addition, a thumbnail of the digital content 22 can be stored in the HTTP directory 60 which is accessible by the content consumer 30 connected to the network 26.

The DCP system 18 sends 110 a message to the DRM system 24 over the network 26 indicating that the metadata and the publication information associated with the digital content 22 is available. The message can be implemented using, for example, a set of application program interface (API) function calls that can establish a connection to the DRM system 24 using a password and user name. The message can be implemented using an XrML rights label containing metadata information and publication information associated with the digital content 22.

The XrML rights label may also contain the location of the digital content 22, an encryption protection key, and rights for using the protected content. The XrML also can register the content 22 with the DRM system 24; however, the content is stored in the DCP system 18 and not in the DRM system. The DRM system 24 can then extract the information from the label and store it in the label database. Once the label representing the content is registered with the DRM system 24, the content distributor 28 may access the label information to populate their Web-catalog.

The content distributor 28 can now make available 112 the digital content 22 that is stored in the DCP system 18 to a content consumer 30. The DCP system 18 can send a signal to the content distributor system 28 to alert the system 28 that it can proceed to retrieve the label information from the DRM system 24. If the content distributor 28 decides to retrieve the label, then it can then parse the label and extract the desired metadata and publication information, such as pricing, and populate the content distributor 28 database 36. The content distributor 28 can be a Web-site/storefront and can use the information in the database 36 to provide a Web-catalog.

The content consumer 30 can search 114 the Web-catalog of the content distributor 28 to purchase protected digital content 22. The digital content 22 can be accessed using the URL locations of the content and of the thumbnail which are stored in the content database as a reference. For example, if a thumbnail is displayed on a Web-page, the URL location is what points to the actual thumbnail located on the DCP system 18. As discussed above, neither the content nor the thumbnail is stored in the content distributor computer 28. If the content consumer 30 decided to purchase digital content 22, then transactions including credit card processing can be performed by the content distributor computer 28. Once the transactions are complete and the content consumer 30 has been authorized to access the digital content 22, then the content distributor 28 can request the DRM 24 to generate a license for the particular purchased digital content 22.

The license can be an XrML document that can be derived from the XrML rights labels discussed above. The license can contain purchase rights and conditions, customized protection key, and digital signatures for the license and the protected content. The customized protection key is encrypted using the content consumers' public key, so only the consumer with the corresponding private key can decrypt the protected content. Once the license is generated, it can be sent back to the content distributor 28 who then subsequently can deliver it to the content consumer 30.

The content consumer 30 may be provided with a Web-page containing a link to download the license and to access the protected digital content 22. The content consumer 30 downloads the license to their local machine to view the protected content 22. Once the license has been downloaded, the consumer can view the content by clicking the appropriate content link. For example, for streaming digital content, the link may point to the content publisher RSTP directory. The protected content can then be streamed down to the consumer and rendered (consumed) using the appropriate license.

FIGS. 4A-4B are screen shots of an embodiment of the rights management screen 21 which may provide the content publisher with the ability to enter information related to the digital content. The rights management screen 21 is displayed once the content publisher 32 selects a particular digital content from the DCM system. Referring to FIG. 4A, the background section 72 represents metadata information associated with the selected digital content. Metadata information may include, for example, title, description, author, length, the publisher name, and the publisher Email. As discussed earlier, the metadata information is extracted from the digital content stored on the DCM system. The rights management screen 21 also allows any portion of the metadata information to be modified.

Referring to FIG. 4B, the rights management screen 21 also can provide the content publisher the ability to enter publication information associated with digital content such as distribution and pricing information. The screen 21 can be divided into a distribution information section 74 and a price information section 76.

In the distribution section 74, distribution information can include the name of the distributors, the particular catalog in which the digital content will be placed, the caption, and a keyword section. Under the pricing section 76, pricing information can include a price structure field such as retail, the type of currency used in the distribution arrangement such as dollars, and the price for playing the digital content. In addition, the digital content type field can provide the option for a particular digital content format. For example, the online play selection represents digital content that is in a streaming format. In contrast, the offline play selection represents digital content that is in a non-streaming format such as a downloaded video file played locally on a user's machine. The "publish" button 78 can cause the rights management screen 21 to terminate. In addition, the screen is sent to the DCP system 18 to process the metadata and publication information. The "Clear" button 80 allows the information on the screen to be cleared and new information to be entered.

A number of embodiments of the invention have been described. Nevertheless, it will be understood that various modifications may be made without departing from the spirit and scope of the invention. For example, although one content consumer was shown, more than one content consumer computer 30 can be connected to the network 26 to access the digital content 22. Accordingly, other embodiments are within the scope of the following claims.

What is claimed is:

1. A computer-implemented method implemented by a system that includes a content publisher, a digital content manager, a digital content publication server, a digital rights manager, and a content distributor, the method comprising:
    obtaining, by the digital content publication server, first data that identifies unprotected digital content that has been stored at the digital content manager and that has been selected by the content publisher for distribution or publication;
    obtaining, by the digital content publication server, second data from the digital content manager that causes a digital content publication module of the digital content publication server to be invoked;
    in response to obtaining the second data from the digital content manager, invoking the digital content publication module by the digital content publication server;
    in response to invoking the digital content publication module, receiving the unprotected digital content and metadata associated with the unprotected digital content from the digital content manager by the digital content publication server;
    generating, by the digital content publication server, an interface for display by the content publisher, wherein the interface allows the content publisher to enter publication information associated with the unprotected digital content;
    receiving, by the digital content publication server and from the content publisher, the publication information associated with the unprotected digital using the interface, the publication information comprising distribution information that identifies the content distributor that has been selected to distribute the digital content;
    protecting, by the digital content publication server, the unprotected digital content by one or more processors and the digital content publication module, further comprising:
        encrypting the unprotected digital content; and
        storing the protected digital content in a directory of the digital content publication server without providing the protected digital content to the digital rights manager;
    sending, by the digital content publication server, a rights label including the metadata and the publication information to the digital rights manager for registration by the digital rights manager;
    obtaining, by the digital content publication server and from the digital rights manager, third data that indicates that the rights label has been registered with the digital rights manager; and
    transmitting an alert, by the digital content publication server to the content distributor, to indicate that the content distributor can retrieve the rights label from the digital rights manager, making the protected digital content available for distribution from the digital content publication server to a customer of the content distributor.

2. The method of claim 1, wherein the digital content includes at least one of streaming video content, music content, graphic content, print content, sound content, or audio content.

3. The method of claim 1, wherein the metadata includes at least one of a name, length, publisher, location, or description associated with the digital content.

4. The method of claim 1, wherein the publication information further comprises at least one of pricing, rights, or catalog information associated with the digital content.

5. The method of claim 1, wherein the rights label comprises an eXtensible Rights Markup Language (XrML) rights label.

6. The method of claim 1, wherein the digital content publication module comprises an active server page (ASP).

7. The method of claim 1, wherein obtaining data from the digital content manager further comprises receiving a hypertext transfer protocol (HTTP) request.

8. The method of claim 1, wherein providing the interface further comprises populating fields of the interface with at least a portion of the metadata.

9. The method of claim 1, wherein the content distributor, the digital content manager, the digital content publication server, and the digital rights manager are each implemented on discrete servers.

10. A system comprising:
    one or more computers; and
    a computer-readable medium coupled to the one or more computers having instructions stored thereon which, when executed by the one or more computers, cause the one or more computers to perform operations comprising:
        obtaining, by a digital content publication server, first data that identifies unprotected digital content that has been stored at a digital content manager and that has been selected by a content publisher for distribution or publication;
        obtaining, by the digital content publication server, second data from the digital content manager that causes a digital content publication module of the digital content publication server to be invoked;
        in response to obtaining the second data from the digital content manager, invoking the digital content publication module by the digital content publication server;
        in response to invoking the digital content publication module, receiving the unprotected digital content and metadata associated with the unprotected digital content from the digital content manager by the digital content publication server;

generating, by the digital content publication server, an interface for display by the content publisher, wherein the interface allows the content publisher to enter publication information associated with the unprotected digital content;

receiving, by the digital content publication server and from the content publisher, the publication information associated with the unprotected digital, using the interface, the publication information comprising distribution information that identifies a content distributor that has been selected to distribute the digital content;

protecting, by the digital content publication server, the unprotected digital content by the digital content publication module, further comprising:
 encrypting the unprotected digital content; and
 storing the protected digital content in a directory of the digital content publication server without providing the protected digital content to a digital rights manager;

sending, by the digital content publication server, a rights label including the metadata and the publication information to the digital rights manager for registration by the digital rights manager;

obtaining, by the digital content publication server and from the digital rights manager, third data that indicates that the rights label has been registered with the digital rights manager; and transmitting an alert, by the digital content publication server to the content distributor, to indicate that the content distributor can retrieve the rights label from the digital rights manager, making the protected digital content available for distribution from the digital content publication server to a customer of the content distributor.

11. The system of claim 10, wherein the digital content includes at least one of streaming video content, music content, graphic content, print content, sound content, or audio content.

12. The system of claim 10, wherein the metadata includes at least one of a name, length, publisher, location, or description associated with the digital content.

13. The system of claim 10, wherein the publication information further comprises at least one of pricing, rights, or catalog information associated with the digital content.

14. The system of claim 10, wherein the rights label comprises an eXtensible Rights Markup Language (XrML) rights label.

15. The system of claim 10, wherein the digital content publication module comprises an active server page (ASP).

16. The system of claim 10, wherein obtaining data from the digital content manager further comprises receiving a hypertext transfer protocol (HTTP) request.

17. The system of claim 10, wherein providing the interface further comprises populating fields of the interface with at least a portion of the metadata.

18. The system of claim 10, wherein the content distributor, the digital content manager, the digital content publication server, and the digital rights manager are each implemented on discrete servers.

19. A computer storage medium encoded with a computer program, the program comprising instructions that when executed by data processing apparatus cause the data processing apparatus to perform operations comprising:

obtaining, by a digital content publication server, first data that identifies unprotected digital content that has been stored at a digital content manager and that has been selected by a content publisher for distribution or publication;

obtaining, by the digital content publication server, second data from the digital content manager that causes a digital content publication module of the digital content publication server to be invoked;

in response to obtaining the second data from the digital content manager, invoking the digital content publication module by the digital content publication server;

in response to invoking the digital content publication module, receiving the unprotected digital content and metadata associated with the unprotected digital content from the digital content manager by the digital content publication server;

generating, by the digital content publication server, an interface for display by the content publisher, wherein the interface allows the content publisher to enter publication information associated with the unprotected digital content;

receiving, by the digital content publication server and from the content publisher, the publication information associated with the unprotected digital content, using the interface, the publication information comprising distribution information that identifies a content distributor that has been selected to distribute the digital content;

protecting, by the digital content publication server, the unprotected digital content by the digital content publication module, further comprising:
 encrypting the unprotected digital content; and
 storing the protected digital content in a directory of the digital content publication server without providing the protected digital content to a digital rights manager;

sending, by the digital content publication server, a rights label including the metadata and the publication information to the digital rights manager for registration by the digital rights manager;

obtaining, by the digital content publication server and from the digital rights manager, third data that indicates that the rights label has been registered with the digital rights manager; and transmitting an alert, by the digital content publication server to the content distributor, to indicate that the content distributor can retrieve the rights label from the digital rights manager, making the protected digital content available for distribution from the digital content publication server to a customer of the content distributor.

20. The computer storage medium of claim 19, wherein the digital content includes at least one of streaming video content, music content, graphic content, print content, sound content, or audio content.

21. The computer storage medium of claim 19, wherein the metadata includes at least one of a name, length, publisher, location, or description associated with the digital content.

22. The computer storage medium of claim 19, wherein the publication information further comprises at least one of pricing, rights, or catalog information associated with the digital content.

23. The computer storage medium of claim 19, wherein the rights label comprises an eXtensible Rights Markup Language (XrML) rights label.

24. The computer storage medium of claim 19, wherein the digital content publication module comprises an active server page (ASP).

25. The computer storage medium of claim 19, wherein obtaining data from the digital content manager further comprises receiving a hypertext transfer protocol (HTTP) request.

26. The computer storage medium of claim 19, wherein providing the interface further comprises populating fields of the interface with at least a portion of the metadata.

27. The computer storage medium of claim 19, wherein the content distributor, the digital content manager, the digital content publication server, and the digital rights manager are each implemented on discrete servers.

* * * * *

UNITED STATES PATENT AND TRADEMARK OFFICE
CERTIFICATE OF CORRECTION

| | | |
|---|---|---|
| PATENT NO. | : 7,895,123 B1 | Page 1 of 1 |
| APPLICATION NO. | : 09/879267 | |
| DATED | : February 22, 2011 | |
| INVENTOR(S) | : L. Garren Du et al. | |

It is certified that error appears in the above-identified patent and that said Letters Patent is hereby corrected as shown below:

In column 9, line 60, in claim 1, delete "digital" and insert -- digital content, --, therefor.

In column 9, line 66-67, in claim 1, delete "comprising;" and insert -- comprising: --, therefor.

In column 11, line 10, in claim 10, delete "digital," and insert -- digital content, --, therefor.

Signed and Sealed this
Seventh Day of June, 2011

David J. Kappos
*Director of the United States Patent and Trademark Office*